United States Patent
Meneely et al.

(10) Patent No.: US 7,379,166 B2
(45) Date of Patent: *May 27, 2008

(54) COMBINED LASER ALTIMETER AND GROUND VELOCITY MEASUREMENT APPARATUS AND A FIBER OPTIC FILTER EDGE DETECTOR OF DOPPLER SHIFTS FOR USE THEREIN

(75) Inventors: Clinton T. Meneely, Burnsville, MN (US); Gary E. Halama, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 62 days.

This patent is subject to a terminal disclaimer.

(21) Appl. No.: 11/329,443

(22) Filed: Jan. 11, 2006

(65) Prior Publication Data

US 2006/0126055 A1    Jun. 15, 2006

Related U.S. Application Data

(63) Continuation-in-part of application No. 10/825,062, filed on Apr. 15, 2004, now Pat. No. 7,079,228.

(51) Int. Cl.
*G01P 3/36* (2006.01)
*G02B 27/14* (2006.01)

(52) U.S. Cl. .................. 356/28.5; 356/28; 356/454; 359/629

(58) Field of Classification Search ............... 356/4.01, 356/4.06, 5.01, 5.14, 28, 28.5, 453, 454; 359/260, 629–640

See application file for complete search history.

(56) References Cited

U.S. PATENT DOCUMENTS

| | | | |
|---|---|---|---|
| 4,395,121 A * | 7/1983 | Nory et al. | 356/141.1 |
| 5,241,315 A | 8/1993 | Spinhirne | |
| 6,246,822 B1 * | 6/2001 | Kim et al. | 385/116 |
| 6,665,063 B2 | 12/2003 | Jamieson et al. | |
| 6,717,655 B2 | 4/2004 | Cheng et al. | |
| 6,894,768 B2 | 5/2005 | Caldwell et al. | |
| 7,095,489 B2 * | 8/2006 | Jennings et al. | 356/5.01 |
| 2003/0043058 A1 | 3/2003 | Jamieson et al. | |
| 2004/0135992 A1 * | 7/2004 | Munro | 356/4.01 |
| 2004/0179186 A1 | 9/2004 | Meneely et al. | |
| 2005/0094282 A1 * | 5/2005 | Minakawa et al. | 359/634 |

* cited by examiner

*Primary Examiner*—Isam Alsomiri
(74) *Attorney, Agent, or Firm*—Kevin O'Brien and Calfee, Halter & Griswold LLP

(57) ABSTRACT

A fiber optic filter edge detector of Doppler shifted light comprises: a laser source for emitting pulsed laser light substantially over a first fiber optic path; an optical lens for directing laser light emitted from the first fiber optic path to free-space and for receiving laser light returns from free-space and focusing the laser light returns to the first fiber optic path; an edge filter optical element fiber coupled to the first fiber optic path for receiving the laser light returns, the edge filter optical element operative to transmit a first portion of the laser light returns through a second fiber optic path and to reflect a second portion of the laser light returns through a third fiber optic path; and at least one light detector optically coupled to the second and third fiber optic paths.

20 Claims, 7 Drawing Sheets

COMBINED LASER ALTIMETER AND GROUND VELOCITY MEASUREMENT APPARATUS AND A FIBER OPTIC FILTER EDGE DETECTOR OF DOPPLER SHIFTS FOR USE THEREIN

This application is a continuation-in-part application of U.S. patent application Ser. No. 10/825,062, filed Apr. 15, 2004, entitled "Combined Laser Altimeter and Ground Velocity Measurement System", now U.S. Pat. No. 7,079,228, and assigned to the same assignee as the instant application, which application being incorporated herein by reference in its entirety.

BACKGROUND OF THE INVENTION

The present invention is directed to avionic systems for measuring above ground level (AGL) altitude and ground velocity of an aircraft in general, and more particularly, to combined laser measurement apparatus for measuring both above ground level (AGL) altitude and ground velocity of the aircraft and a fiber optic filter edge detector of Doppler shifts for use therein.

Today's military and commercial aircraft desire more precise measurements of aircraft position and position information. Ground based RADAR systems and Global Positioning Systems (GPS) allow for precise positioning of an aircraft in latitude and longitude desirable for air traffic control, aircraft separation, and navigation. However, precise AGL measurements are often difficult to achieve with such systems, especially for applications in which precise placement above the ground is needed. New levels of precision for altitude or AGL measurements, on the order of +/−6 inches (15 cm), for example, are often required for flight profiles ranging from hover, to nap of the earth (NOE) flight, and autonomous landing. Current aircraft altimeter systems generally can not achieve these precise measurements.

Recently, laser-based altimeters have been proposed for use on-board aircraft. This laser altimeter technology presents a significant advancement over radar altimeters as the ground registered data contains a higher level of resolution due to the narrow beam of the laser. However, the laser altimeters do pose certain concerns when applied to aircraft, especially with regard to the volume of the instrument attributed to the large number of optical elements contained therein. Another concern is directed to the ruggedness of the instrument in an aircraft flight environment. The optical elements of the laser altimeter are generally mounted on an optical bench, adjusted to be precisely aligned with respect to each other and secured in place. But, because of the vibration, shock and wide temperature variation encountered in aircraft flight, the optical elements have a tendency to become misaligned over time and thus, require constant maintenance. In bi-static laser altimeter configurations, back scattering of laser beam transmissions into a telescope portion is an additional concern.

A laser altimeter which overcomes the aforementioned concerns of laser altimeters by providing a compact laser altimeter which improves upon size, ruggedness and maintenance of the instrument is described in the co-pending U.S. patent application Ser. No. 10/386,334, filed Mar. 11, 2003, entitled "Compact Laser Altimeter System" and assigned to the same assignee as the instant application.

Laser systems have also been proposed for use on-board the aircraft in measuring the ground velocity thereof. These ground velocity laser systems propose to use the backscattering of laser emissions off of the ground, similar to laser altimeters, to measure the ground velocity. However, such laser based ground velocity measurement systems usually have more stringent optical alignment concerns than those for the laser altimeters described above.

The present invention overcomes the aforementioned concerns by integrating the capability of measuring ground velocity into a laser altimeter system, such as the system described in the co-pending patent application Ser. No. 10/386,334, for example, to effect a laser based system for measuring both AGL altitude and ground velocity in a common instrument. Through use of fiber optical and signal processing elements, the resulting combined instrument maintains substantially the features of small size, ruggedness and ease of maintenance.

SUMMARY OF THE INVENTION

In accordance with one aspect of the present invention, a fiber optic filter edge detector of Doppler shifted light comprises: a laser source for emitting pulsed laser light substantially over a first fiber optic path; an optical lens for directing laser light emitted from the first fiber optic path to free-space and for receiving laser light returns from free-space and focusing the laser light returns to the first fiber optic path; an edge filter optical element fiber coupled to the first fiber optic path for receiving the laser light returns, the edge filter optical element operative to transmit a first portion of the laser light returns through a second fiber optic path and to reflect a second portion of the laser light returns through a third fiber optic path; and at least one light detector optically coupled to the second and third fiber optic paths.

DETAILED DESCRIPTION OF THE INVENTION

The principle used in the present laser-based ground velocity measurement apparatus embodiment is to emit pulses at a predetermined wavelength and pulse repetition rate from a laser source to a position on the ground and receive the laser light backscattering off of the ground position. The backscattering of laser light will be Doppler shifted in wavelength in proportion to the portion of the ground speed of the aircraft along the directional vector of the scan position of the emitted laser pulses. Thus, by determining the Doppler shift of the emitted wavelength and the scan position of the laser beam, the associated ground speed projected along the directional vector may be calculated. By triangulating these projected ground speed measurements at three or more scan positions or angles, the absolute ground velocity of the aircraft may be determined, without requiring aircraft attitude information. The term "ground" as used in this application shall mean any surface over which the aircraft may fly including land, water, objects, . . . etc. and any combinations thereof.

Figure 1:
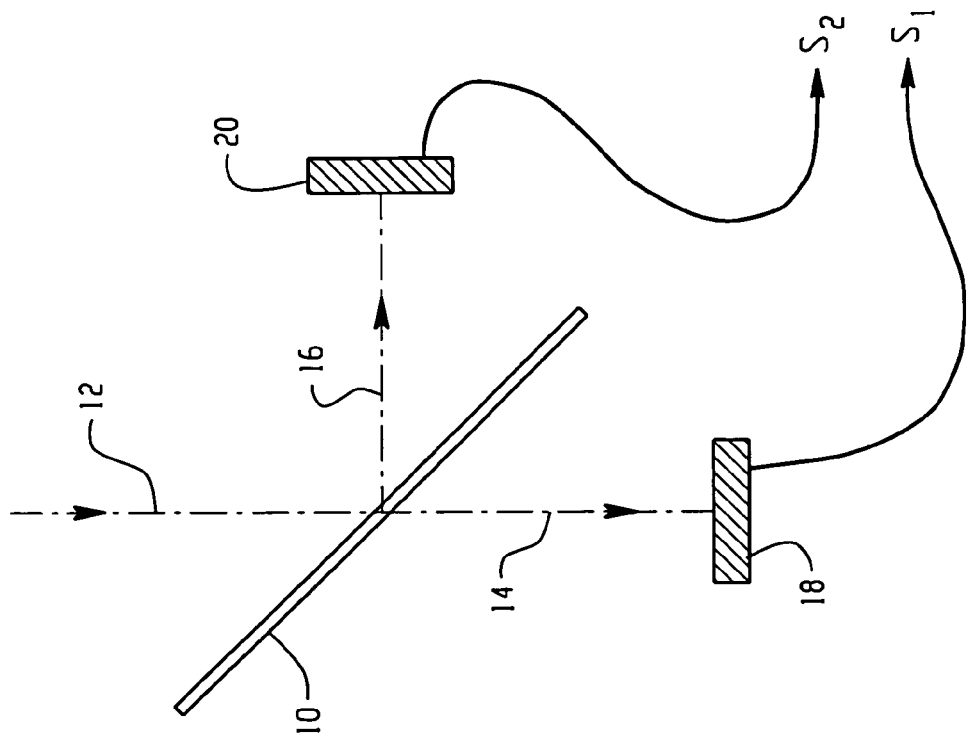
FIG. 1 is an illustration of apparatus for filter edge detection of Doppler shifted wavelength ground return signals suitable for use in an embodiment of the present invention.

In the present embodiment, Doppler shift of wavelength is determined by a process of filter edge detection. FIG. 1 is an illustration of apparatus for filter edge detection of Doppler shifted wavelength ground return signals suitable for use in the present embodiment which will be described herein below in connection with the illustration of FIG. 3. Referring to FIG. 1, an optical filter element 10 which may be a dichroic beam splitter, for example, is disposed in an optical path 12 of the Doppler shifted ground return pulses.

Figure 2:
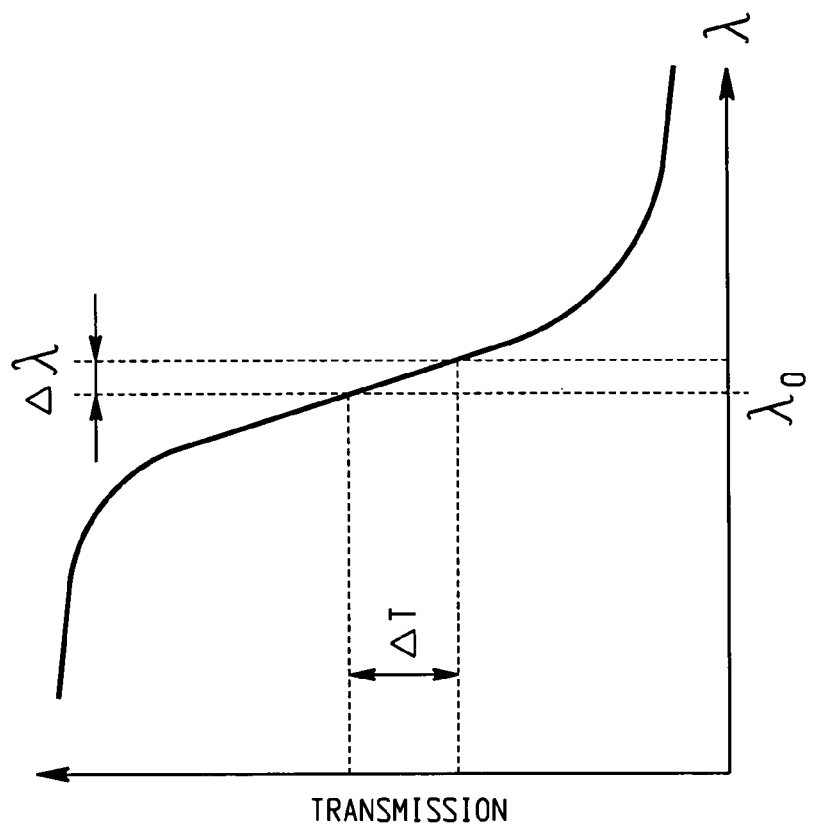
FIG. 2 is a graph of a response characteristic curve of an optical filter element suitable for use in the apparatus of FIG. 1.

The optical filter element 10 has a response characteristic curve shown by way of example in the graph of FIG. 2. Note that the response curve exhibits a very sharp cut off transmission response with respective to wavelength. In the present embodiment, the filter angle of the optical element 10 is tuned such that the unshifted laser line $\lambda_0$ is approximately half-way down the cut-off edge. In this manner, a Doppler shift in wavelength of $\Delta\lambda$ will fall along the filter edge of the response curve and effect a difference $\Delta T$ in filter transmission of the ground return pulses. Thus, as shown in the illustration of FIG. 1, a first portion of the ground return pulses will be transmitted or passed through the optical filter element 10 along an optical path 14 based on the wavelength Doppler shift $\Delta\lambda$ thereof. A second or remaining portion of the ground return pulses will be reflected by the optical element 10 along an optical path 16. There may be some loss of optical signal in the filter element 10, but this should affect both the transmitted and reflected portions in a measurable and repeatable manner and thus can be accounted for in the data processing.

While a dichroic beam splitter is used as the optical filter element 10 in the present embodiment, it is understood that other optical filter elements may be used just as well. Examples of other optical filter elements which may be used include: optical etalons or Fabry-Perot cavities tuned by tilting; pressure, thermal control, or piezo-electric drivers; bandpass filters with sufficiently sharp edges; and atomic or molecular gas absorption filters. If this system is embodied in a fiber-optic configuration, a tunable fiber optic etalon may also be used, for example.

Light detectors 18 and 20 may be disposed in the paths 14 and 16 of the transmitted and reflected portions of the ground return pulses, respectively, to receive and convert the respective light pulses into electrical signals proportional thereto. Accordingly, electrical signals $S_1$ and $S_2$ output from the signal detectors 18 and 20 are proportional to the transmitted and reflected portions, respectively, of the ground return pulses. By taking the ratio of the sum and difference of the electrical signals $[(S_2-S_1)/(S_1+S_2)]$ while accounting for losses in the filter element, ground return pulse amplitude effects may be substantially eliminated in determining the wavelength Doppler shift $\Delta\lambda$ of the ground return pulses. Due to differing filter edge shapes, this ratio expression may not bear a linear relationship to the Doppler shift, but the exact relationship can be determined for the particular filter used.

Figure 3:
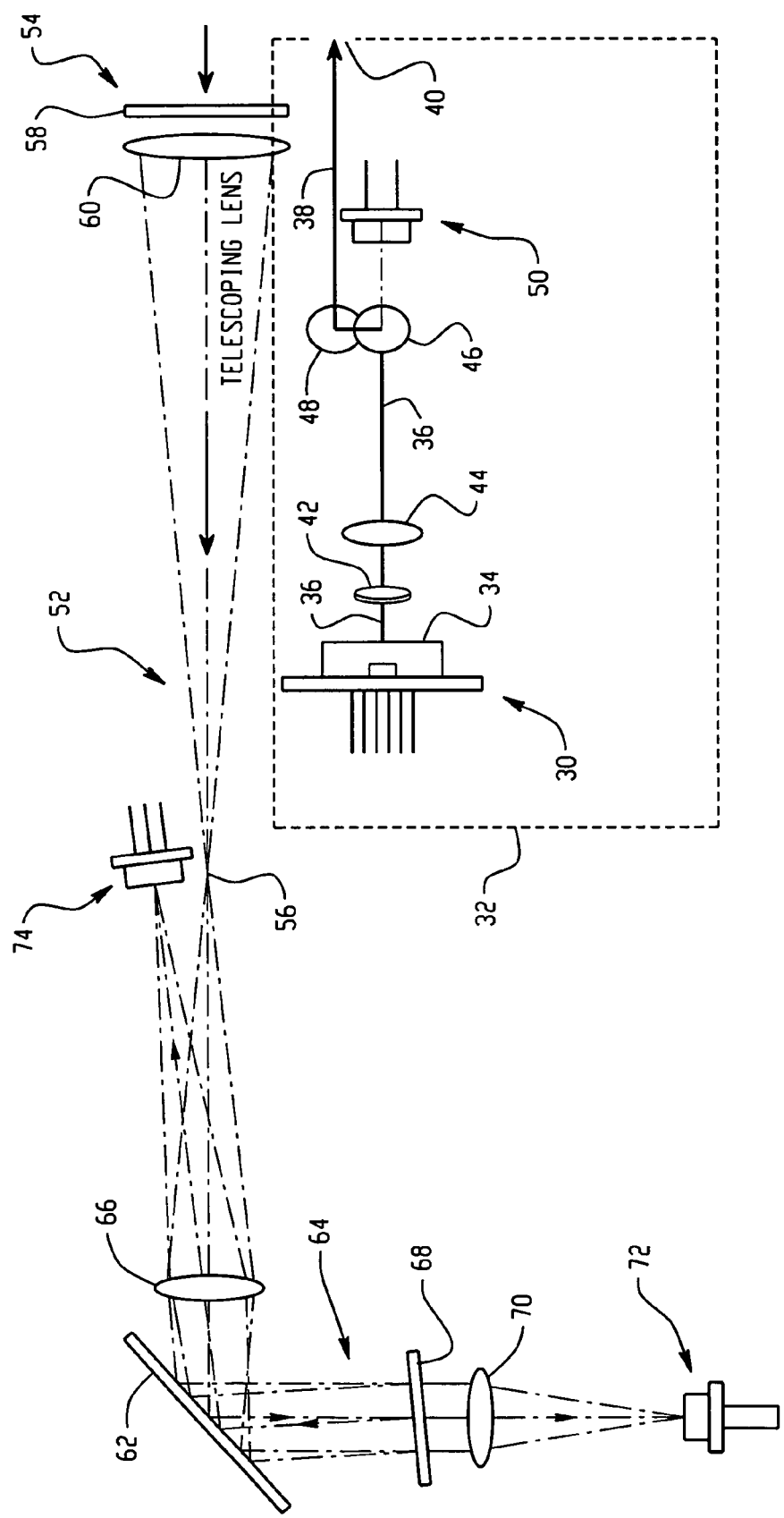
FIG. 3 is an illustration of a combined laser altimeter and ground speed measurement apparatus suitable for embodying the broad principles of the present invention.

A combined laser altimeter and ground speed velocity instrument suitable for embodying the principles of the present embodiment is shown in the illustration of FIG. 3. The embodiment of FIG. 3 uses many of the same optical elements and is configured in much the same way as an embodiment described in the above-referenced co-pending patent application Ser. No. 10/386,334 which is incorporated by reference herein for providing a more detailed description thereof and other suitable exemplary embodiments of a laser altimeter instrument for use in the present invention. Referring to FIG. 3, a laser source 30 is disposed in a laser transmitter assembly denoted by the dashed line block 32. The laser source 30 may be a microlaser of the type manufactured by Northrup Grumman Poly-Scientific, bearing model number ML0005, for example. In the present embodiment, the microlaser 30 is an autonomously operated, passively Q-switched Nd:YAG microchip laser pumped by a 950 micron diode to generate pulsed laser beams at a rate of approximately 8-10K pulses per second (pps) and at a predetermined wavelength, which may be approximately 1064 nanometers (nm), for example.

The microlaser 30 may be contained in a TO-3 container or can which may be fixedly secured to a wall of a housing of the instrument much in the same manner as described for the embodiment of the incorporated co-pending application. The TO-3 can also includes a windowed top surface 34 from which the pulsed laser beams emit over a first optical path 36. It is understood that the specific pulse repetition rate and wavelength of the microlaser 30 are provided merely by way of example, and that other rates and wavelengths may be used just as well without deviating from the broad principles of the present invention. For example, for eye safe operation, a laser emitting at a wavelength of approximately 1.5 microns may be chosen.

Fixedly supported in a compact configuration within an emission cavity of the instrument is a plurality of first optical elements for directing the laser beams from the first optical path 36 to a second optical path 38 which exits the housing of the instrument through an exit aperture at 40. The plurality of first optical elements may comprise a band pass or blocking filter optical element 42 disposed in proximity to the windowed surface 34 of the microlaser 30 along the optical path 36. The optical element 42 may cover substantially the entire emission cavity opening so as to block substantially the laser pump diode light and other wavelengths of light outside of a predetermined bandwidth around the predetermined wavelength of the laser beam from entering the emission cavity. To minimize optical feedback that may cause laser instabilities and to minimize the heat load on the laser chip, optical element 42 may be disposed at an angle to the optical path 36 so that the surface thereof does not reflect light directly back into the laser source 30.

Another first optical element of the plurality may be a collimating lens 44 disposed along the first optical path 36 down stream of the filter element 42 for collimating and preventing further divergence of the laser beams along the path 36. Collimating lens 44 may be disposed along path 36 so as to match the laser beam divergence to a field of view of a telescope portion of the altimeter for optimum efficiency as will become better understood from the description below. While the lens 44 and filter 42 are provided in the present embodiment, it is understood that due to the laser selected and the compactness of the overall configuration, one or both of the lens 44 and filter 42 may not be used in some applications.

To render the compact configuration of first optical elements, it is understood that the emission beam path or optical train of the transmitter assembly may take various shapes. In the present embodiment, the beam path is shaped into a vertical "Z" with the elements 42 and 44 on a top level and the exit aperture 40 disposed at a bottom level. A vertical channel of the assembly cavity connects the top and bottom levels. Two fold mirrors 46 and 48 are included in the plurality of first optical elements and disposed at the vertical channel to direct the first optical path 36 from the top level to the bottom level and to move the beam close to the receiving telescope portion to minimize the range at which the telescope field of view and the laser spot start to overlap. The fold mirror 46 is disposed at the top level and the other fold mirror 48 is disposed at the bottom level. Accordingly, the combination of fold mirrors 46 and 48 direct the first optical path 36 to the second optical path 38 which exits the housing 10 at aperture 40. One of the fold mirrors 46 or 48 comprises mirror apparatus which is fixedly adjustable for directing the second optical path 38 along a desired optical path as will become more evident from the following description. Preferably, the top fold mirror 46 is the adjustable mirror, but it is understood that that either fold mirror 46 or 48 may be used for adjustment purposes or both mirrors may be adjustable along the independent axes.

Thus, all of the first optical elements are fixedly supported and not movable in the emission cavity of the instrument, except for the adjustable mirror of either fold mirror 46 or 48, and even such mirror apparatus is lockable in place once properly adjusted. The top level of the emission cavity may extend slightly beyond the vertical channel for locating a light detector 50, which may be a photo-diode, for example. In this embodiment, the fold mirror 46 is configured to pass a small portion of the pulsed laser beams for detection by the light detector 50 which converts the detected laser pulses into electrical signals for use as start pulses for time of flight calculations as will become more evident for the description found herein below.

The instrument housing may further include another cavity for containing processing electronics for the laser altimeter and ground speed velocity measurements much in the same manner as described in the incorporated co-pending application. Such processing electronics may be implemented on one or more printed circuit (PC) boards, for example. The light detector 50 may be coupled to the electronics in the electronics cavity for providing the start pulses for time-of-flight and ranging calculations thereby. Alternatively, a light detector diode may be embodied in the TO-3 can of the microlaser 30 for detecting and providing laser start pulses to the processing electronics via an electrical coupling thereto. If a triggerable pulsed laser is used, the trigger signal may also serve as the timing start pulse. It is understood that these techniques for generating trigger or start pulses are provided by way of example and that any method used will depend on available space and the particular optical system design.

A telescope portion 52 comprising a plurality of second optical elements is included in another hollow cavity of the instrument with an entrance aperture at 54 much in the same manner as described in the incorporated co-pending application. The plurality of second optical elements are fixedly disposed and configured within the hollow cavity to form a telescope with a predetermined field of view which is preferably fixed. The telescope portion 52 is operative to receive at the entrance aperture 54 reflections of the pulsed laser beams from the ground position within the field of view thereof and to focus the received reflections substantially to a focal point 56. The telescope portion 52 includes a band pass filter optical element 58 disposed at the entrance aperture 54 for passing received wavelengths of light solely within a predetermined bandwidth around the predetermined wavelength $\lambda_o$ of the pulsed laser beams. Thus, the filter optical element 58 minimizes background light interference from the outside environment from entering the telescope cavity. In addition, the field of view of the telescope may have to be minimized to further reduce interference from background solar radiation, for example. In some applications, a clear window may be disposed at aperture 54 to seal and protect the telescope from scratches and outside contamination; however, the filter optical element 58 could be mounted in such a way to serve the same purpose.

To form the telescope, the telescope portion 52 includes a convex or converging lens 60 disposed in proximity to the entrance aperture 54. In the present embodiment, the telescope lens 60 is configured to have a predetermined focal length, which may be approximately 150 millimeters (mm), for example, for focusing the received reflections from the entrance aperture 54 to the focal point 56, which falls within the telescope cavity. A fold mirror 62 may be fixedly disposed within the telescope cavity downstream of the focal point 56 to reflect the received light rays illustrated by the arrowed lines along a different optical path 64. If the optical elements of the telescope portion 52 were to be used solely for AGL altitude measurements, then a single light detector would be disposed in the path 64 for receiving the light reflections off of the ground. The present embodiment combines the AGL altitude measurements with ground velocity measurements, and thus includes additional optical elements for this purpose.

One of the additional optical elements of the telescope portion 52 is a recollimating lens 66 disposed between the focal point 56 and fold mirror 62 to recollimate the expanding light reflections from focal point 56 prior to being reflected by the mirror 62. Accordingly, the light reflected by the mirror 62 along path 64 is substantially collimated. Another of the additional optical elements is a tilt-tuned etalon 68 disposed in the optical path 64. The etalon element 68 operates as the optical filter element 10 described in connection with the embodiment of FIGS. 1 and 2 and may be tilt-tuned so that the wavelength $\lambda_o$ falls mid-way along the sharp cut-off filter edge of the response curve as described supra. Thus, a portion of the ground reflected light will be transmitted through the etalon element 68 and be refocused by a lens 70 to a light detector 72 much the same as described for the embodiment of FIGS. 1 and 2.

Likewise, the remaining portion of the ground reflected light (absent that lost in the filter element itself) will be reflected by the etalon element 68 back to the fold mirror 62 along path 64. From mirror 62, the remaining portion of the ground reflected light is redirected by the mirror 62 back to the lens 70 wherein it is refocused to another light detector 74 much the same as described for the embodiment of FIGS. 1 and 2. Both of the light detectors 72 and 74 may be avalanche photo-diodes operative to convert the received light pulse into an electrical signal representative thereof. The outputs of the light detectors 72 and 74 may be coupled to the processing electronics in the electronics cavity for use in both ground velocity and altitude ranging calculations thereby as will become better understood from the description infra.

Moreover, while the emission, electronics and telescope cavities are provided in a common housing in the present embodiment, it is understood that such cavities may be provided in separate housings in an alternate embodiment. Such housings may be sections of a common housing in yet another embodiment. In any event, the common denominator for all such embodiments of the combined laser-based instrument is to render the unit compact and rugged for use in an aircraft flight environment. The present embodiment of the instrument may have overall exemplary dimensions in length L, width W and depth D of approximately 7.5 inches or 19 cm, 3.5 inches or 8.75 cm, and 3.5 inches or 8.75 cm, respectively. In addition, while the aforementioned additional elements are employed with the laser-based AGL altitude measurement embodiment of FIG. 3, it is understood they may also be implemented in other laser-based AGL altitude measurement embodiments, like those described in the incorporated co-pending application referenced herein above, for example, without deviating from the broad principles of the present invention.

Figure 4:
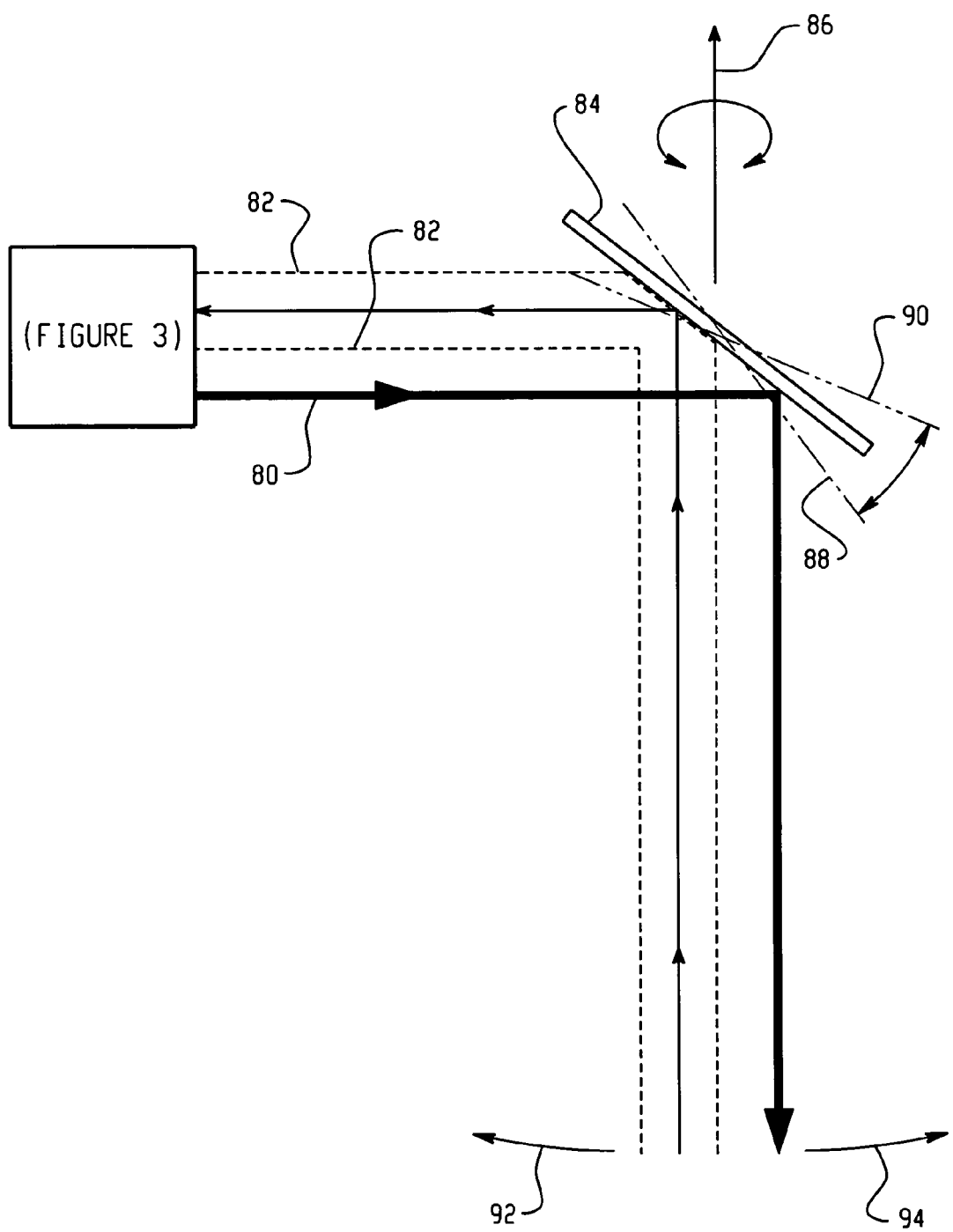
FIG. 4 is an illustration of apparatus for scanning both an emitted laser beam and a field of view of a telescope in fixed alignment suitable for use with the embodiment of FIG. 4.

The emission and telescope cavities, whether in the same housing or separate housings, are fixedly secured in alignment with respect to each other to permit the output optical path of the pulsed laser beams (see darkened arrowed line 80 in FIG. 4) to be fixedly co-aligned with the field of view of the telescope (see dashed lines 82 in FIG. 4). Note that only one first optical element of the plurality, like mirror 46, for example, is fixedly adjustable for co-aligning the output optical path 80 with the field of view 82. A pair of fixedly adjustable Risley prisms placed before a fixed turn mirror 46 may be used to accomplish the same purpose. In the present embodiment, the emission and telescope cavities may be machined in the common housing to align the entrance and exit apertures respectively thereof in proximity to each other. It is preferable to have the apertures 40 and 54 as close as possible to each other. The exit aperture 40 may be offset slightly behind or in back of the entrance aperture 54 to avoid any direct backscattering of the transmitted laser beams into the entrance aperture 54 and telescope cavity. In addition, a flat window may be disposed at the exit aperture 40 for sealing the emission cavity from the outside environment. Also, this window may be tilted with respect to the plane of the exit aperture 40 to avoid reflections from the laser beams from traveling back down the transmitting optical path into the laser, possibly causing laser instabilities thereby. In addition, laser light may be reflected from the tilted window to a photodiode as another technique for generating the timing start pulses as described herein above.

FIG. 4 is an illustration of a scanner assembly suitable for use in the present embodiment for scanning the laser beam 80 and co-aligned field of view 82 of the telescope to different ground positions while maintaining the co-alignment. Referring to FIG. 4, a scanner mirror 84 is disposed in the path of the emitted laser beam 80 and co-aligned field of view 82 at an appropriate quiescent angle for projecting the laser beam 80 and co-aligned field of view 82 to a desired position on the ground. In the present embodiment, the scanner mirror 84 may be rotated about an axis 86 to different angles shown by the dashed lines 88 and 90 by a motor assembly (not shown). At the different angles 88 and 90, the scanner mirror moves the emitted laser beam 80 and co-aligned field of view 82 in directions as shown by the arrowed lines 92 and 94, respectively, to desired different ground positions. The mirror motor may be controlled to direct the laser beam 80 and co-aligned field of view 82 to a plurality of desired ground positions by the processing electronics as will become more evident from the following description.

Figure 5:
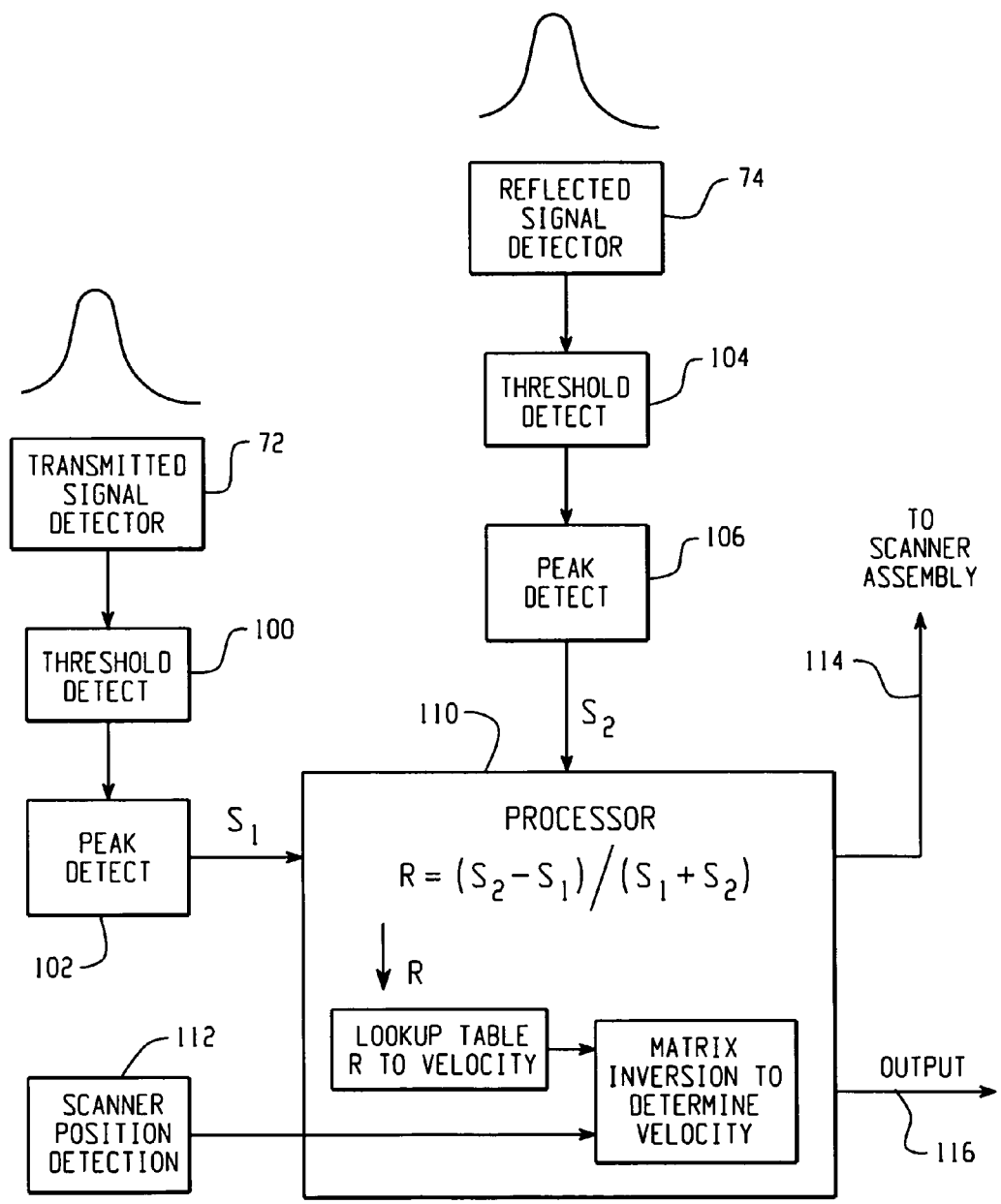
FIG. 5 is a functional block diagram schematic of processing electronics for computing a measurement of ground velocity suitable for use in the present embodiment.

A functional block diagram schematic of processing electronics for computing a measurement of ground velocity suitable for use in the present embodiment is shown in FIG. 5. The processing electronics may be disposed on one or more printed circuit (PC) cards located in the electronics cavity of the instrument, for example. Referring to FIG. 5, the light detectors 72 and 74 are represented by like reference numeral functional blocks. The output of light detector 72 which is an electrical pulse representative of the transmitted portion of the ground reflected pulse is input to a threshold detect block 100. If the electrical pulse amplitude of the transmitted signal portion is greater than a predetermined threshold, the block 100 passes the pulse signal to a peak detector block 102 which captures and outputs the peak amplitude, denoted as $S_1$, of the transmitted pulse signal.

Similarly, the output of light detector 74 which is an electrical pulse representative of the reflected portion of the ground reflected pulse is input to a threshold detect block 104. If the electrical pulse amplitude of the reflected signal portion is greater than a predetermined threshold, the block 104 passes the pulse signal to a peak detector block 106 which captures and outputs the peak amplitude, denoted as $S_2$, of the transmitted pulse signal. The signals $S_1$ and $S_2$ may be input to a processor 110, which may be a programmed microprocessor, for example. Also, the processing electronics may include a detector 112 for detecting the position of the laser beam scan (vector) at which each ground speed calculation is performed. The laser scan position may be provided as a motor drive signal or provided by a sensor located on the shaft of the scanner mirror, for example. In the processor 110, a ratio R is computed by taking the difference and sum of signals $S_1$ and $S_2$, and dividing the difference by the sum as follows:

$$R=[(S_2-S_1)/(S_1+S_2)]$$ (note that $S_1$ and $S_2$ may have to be corrected for filter and fiber connection losses).

A look-up table may be provided in the processor 110 for correlating ground speed with the above calculated ratio R. So, as a new ground reflection pulse is received, $S_1$ and $S_2$ are determined and the laser scan position is captured for that pulse. The ratio R is calculated and the portion of the ground speed projected along the directional scan vector of line-of-sight is accessed from the look-up table based on the instant ratio R. This portion of the ground speed and the associated scan position may be saved in processor 11O. Thereafter, the scanner mirror 84 (see FIG. 4) may be directed by processor 110 over signal line 114, for example, to project the laser beam 80 and co-aligned field of view 82 to a different ground position and calculate the projected ground speed for this new ground position in the same manner. The process will be repeated by processor 110 until projected ground speeds are determined and saved for at least three ground scan positions. Then, the processor 110 may perform a triangulation calculation, perhaps by matrix inversion calculation, for example, on the three or more projected ground speeds and associated scan positions to determine the instantaneous velocity vector of the aircraft with respect to the ground, i.e. true ground velocity. This calculation may be expressed in an orthogonal X, Y, and Z coordinate system by the following relationship:

$$\begin{bmatrix} X, Y, Z \\ \text{Rotation} \\ \text{Matrix} \end{bmatrix} \times \begin{bmatrix} \text{Projected} \\ \text{Speed} \\ \text{Vector} \end{bmatrix} = \begin{bmatrix} \text{Ground} \\ \text{Speed} \\ \text{Vector} \end{bmatrix}$$

Accordingly, an inversion of the X, Y, and Z Rotation matrix term multiplied by a matrix comprised of three different velocity vector terms produces the ground speed vector matrix with respect to the attitude of the aircraft and measuring instrument.

The amplitude of the ground speed vector, which is the vehicle ground speed, may be output over signal line 116. Note that the vehicle airspeed and attitude information is not required for this calculation of ground speed. However, if these data are accessible to the processor 110, absolute vehicle speed, direction and sideslip may also be calculated by the processor 110.

Figure 6:
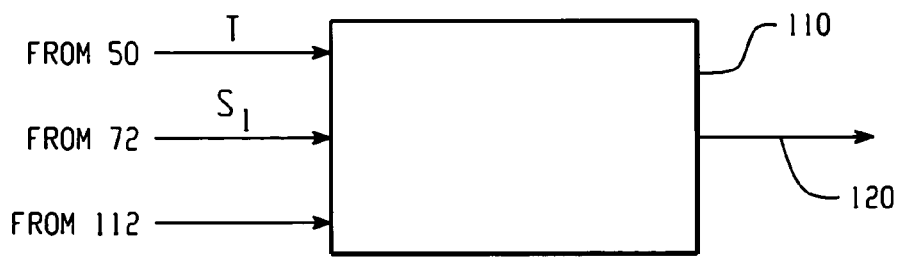
FIG. 6 is a block diagram of a processor for computing altitude suitable for use in the present embodiment.

The same processor 110 may be also programmed to perform an AGL altitude calculation using the start or trigger signal from the light detector 50 and signal $S_1$ from detector 72, for example, as shown in the block diagram of FIG. 6. A time-of-flight measurement may be performed from the time between the start and reception pulses from detectors 50 and 72, respectively, to determine the range to the instantaneous ground position. The processor may compensate the range for instantaneous laser scan position using the signal from the detector 112 to determine the actual AGL altitude which may be output over signal line 120. While the signal $S_1$ is used in the present embodiment for time of flight determinations, it is understood that $S_2$ or a combination of $S_1$ and $S_2$ may be used just as well. Accordingly, both AGL altitude and ground velocity may be determined from common electrical signals and processing electronics embodied in the combined laser-based apparatus.

Figure 7:
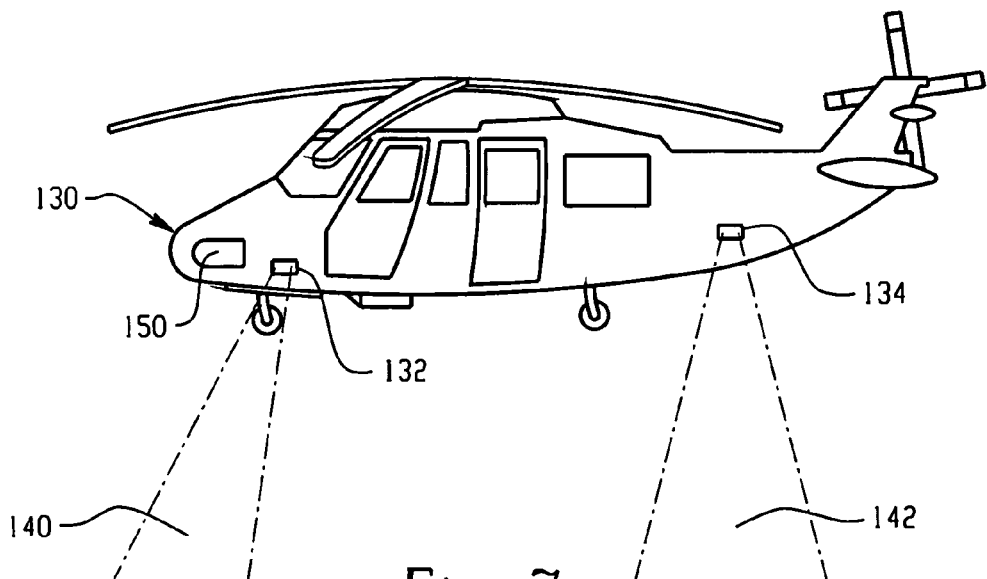
FIGS. 7 and 8 are side and top view illustrations of an exemplary alternate non-scanning embodiment of the present invention.
Figure 8:
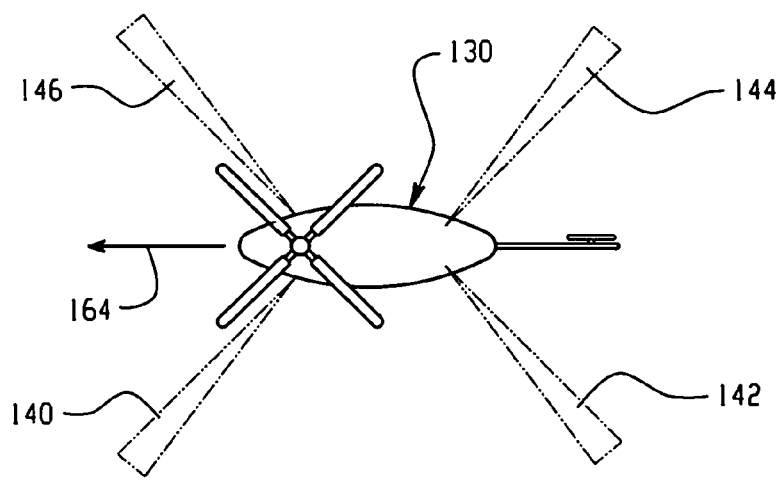

In an alternate non-scanning embodiment to the scanning embodiment described above in connection with FIG. 4, at least three of the combined laser-based measurement apparatus, such as that described for the embodiment of FIG. 3, for example, may be distributed at different locations about the aircraft. Such a non-scanning embodiment is shown in the illustrations of FIGS. 7 and 8 in which a helicopter 130 is used by way of example as the aircraft. While a helicopter aircraft is used for the alternate embodiment, it is understood that the multiple combined laser-based measurement apparatus may just as well be mounted on other aircraft, such as fixed wing aircraft, UAVs and PGMs, for example.

Referring to FIGS. 7 and 8, four combined laser-based measurement apparatus are mounted at different locations on the aircraft 130. In the side view of FIG. 7, only two such apparatus 132 and 134 are shown mounted to the side of the aircraft by way of example. The other two such apparatus may be mounted in similar locations on the other side of the aircraft 130 such as shown in the plan view of FIG. 8. The combined laser-based measurement apparatus may be adjusted to project each of their co-aligned emitted laser beam and field of view paths (see FIG. 4) 140, 142, 144 and 146 at predetermined vectors to corresponding ground positions. While four measurement apparatus are shown by the exemplary embodiment of FIGS. 7 and 8, it is understood that three or more than four measurement apparatus may be mounted to the aircraft for the non-scanning embodiment without deviating from the broad principles of the present invention.

Each of the at least three measurement apparatus may include a threshold detector and peak detector (see FIG. 5) for generating the corresponding transmitted and reflected signals $S_1$ and $S_2$, and a trigger light detector (e.g. 50, FIG. 3) for generating the start or trigger signal T. Accordingly, the signals T, $S_1$ and $S_2$ may be appropriately amplified, if desired, and output from each of the measurement apparatus to a remotely located central processing unit disposed on-board the aircraft. The block diagram schematic of FIG. 9 exemplifies a non-scanning distributed system for the aircraft in which three laser-based measurement apparatus 132, 134 and 136 are mounted to different locations thereof, such as shown by way of example in FIGS. 7 and 8, and output their respective signals T, $S_1$ and $S_2$ to a remotely located on-board processing unit shown within the dashed lines 150.

Figure 9:
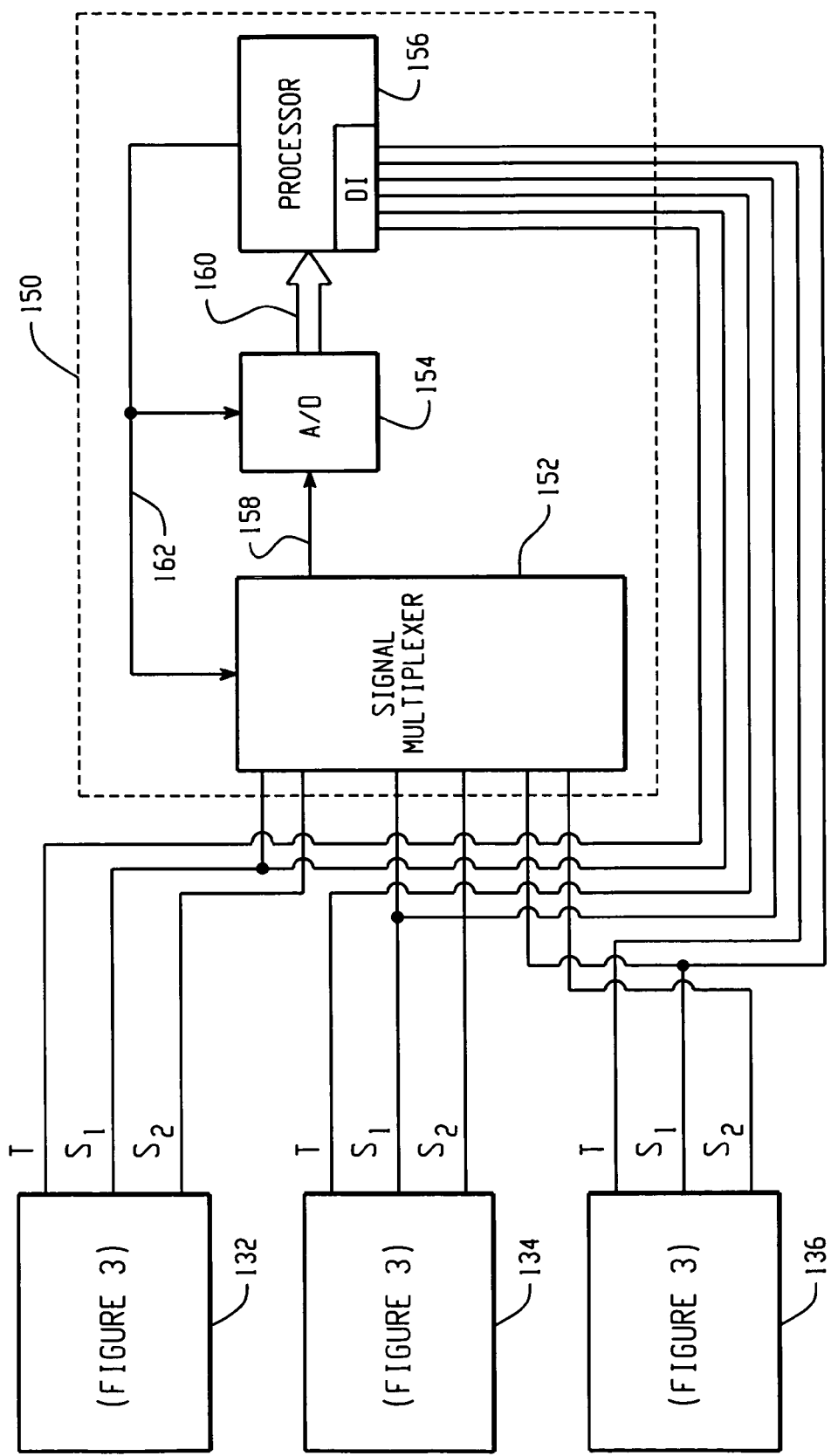
FIG. 9 is a block diagram schematic of exemplary processing electronics suitable for use in the alternate non-scanning embodiment.

Referring to FIG. 9, the processing unit 150 of the present embodiment may comprise a signal multiplexer 152, and analog-to-digital converter (A/D) 154 and a programmed processor unit 156. The signals T and $S_1$ from each of the apparatus 132, 134 and 136 may be coupled over signal lines to a digital input section (DI) of the processor unit 156. Such digital inputs may either be polled or configured as program interrupts by the processor 156 to identify a start and reception times for each of the measurement apparatus 132, 134 and 136. In addition, signals $S_1$ and $S_2$ from each of the apparatus 132, 134 and 136 may be coupled over signal lines to inputs of the multiplexer 152. An output 158 from the multiplexer 152 is coupled to an input of the A/D 154 and output data lines 160 of the A/D 154 are coupled to a data bus of the processor 156. The processor 156 may control the operations of the multiplexer 152 and A/D 154 over control lines 162. In this embodiment, the peak detectors (see FIG. 5) of each of the apparatus 132, 143 and 136 may include a sample-and-hold circuit to hold the peak signals $S_1$ and $S_2$ of a current interpulse period until the peak signals of the next interpulse period are determined.

In a typical operation, the apparatus 132, 134 and 136 may be autonomously operative to emit laser pulses periodically, receive the ground reflections during the interpulse periods and generate the signals T, $S_1$ and $S_2$ for each laser pulse period. The processor unit 156 is programmed to detect the start of each pulse period by monitoring the T signals and to compute the time-of-flight by monitoring the signals $S_1$ and/or $S_2$, for example, for each apparatus. Then, knowing the predetermined vector of the laser beam path, the processor 156 may calculate the AGL altitudes of the aircraft for the corresponding ground positions of the apparatus 132, 134 and 136.

In addition, the processor 156 may be programmed to read in the signals $S_1$ and $S_2$ from the apparatus 132, 134 and 136 for an interpulse period via control of the multiplexer 152 and A/D 154 and compute a ratio R (see FIG. 5) for each apparatus 132, 134 and 136 from the corresponding signals $S_1$ and $S_2$. Through use of a look-up table, the processor 156 may determine a speed of the aircraft for each computed ratio R corresponding to the apparatus 132, 134 and 136. The vector path of each apparatus 132, 134 and 136 may be pre-programmed into the processor 156 for use in combining with the corresponding calculated aircraft speed to compute the ground velocity 164 of the aircraft (see FIG. 8), preferably through a matrix inversion or a triangulation calculation. In this manner, the distributed system of apparatus 132, 134 and 136 may determine both AGL altitude and ground velocity of the aircraft using a common on-board processing unit 150.

Figure 10:
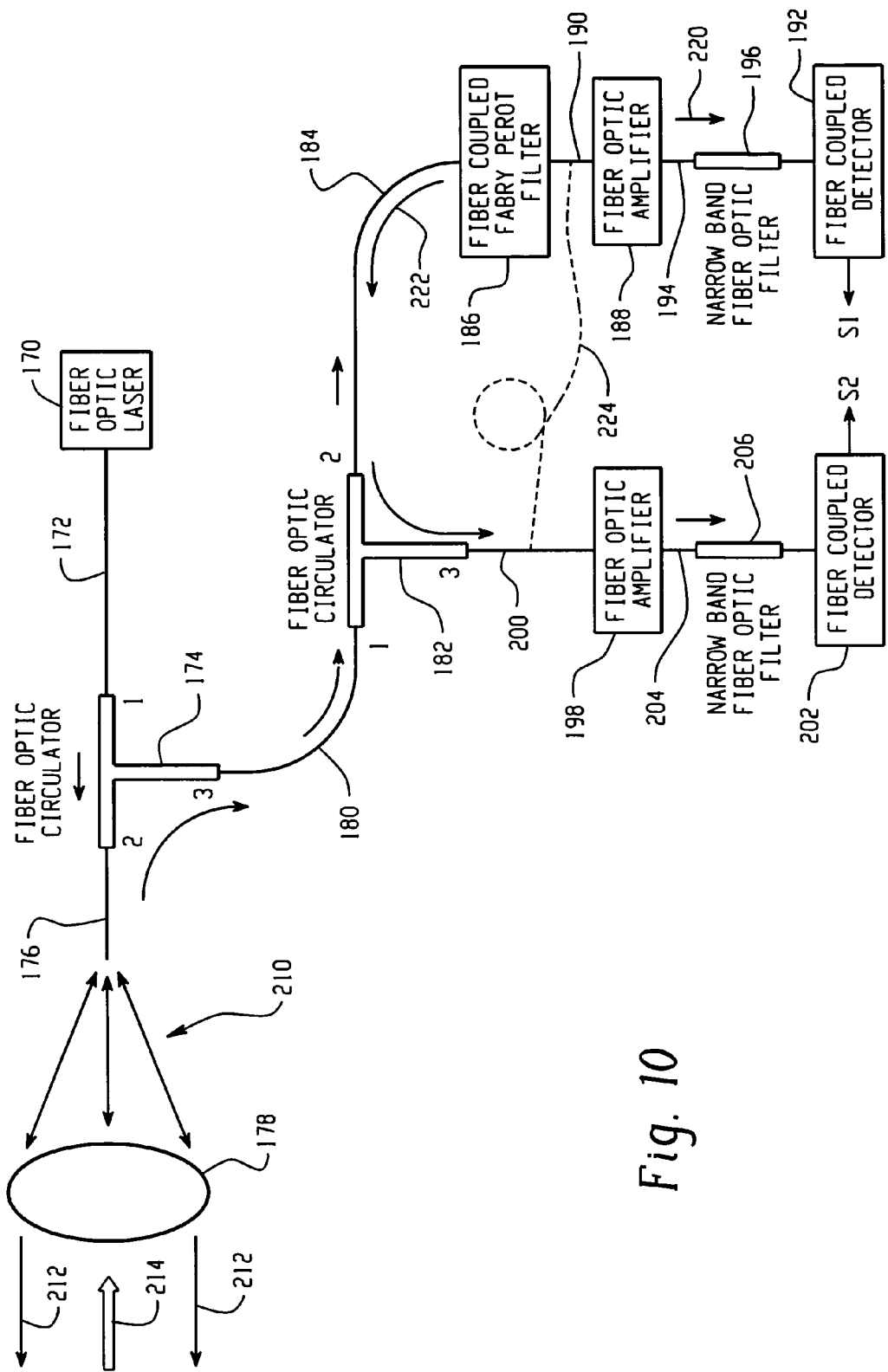
FIG. 10 is an illustration of a fiber optic filter edge detector of Doppler shifted wavelength return signals suitable for use as an alternate embodiment to the free-space optical embodiment of FIG. 3.

FIG. 10 is an illustration of a monostatic, fiber optic filter edge detector of Doppler shifted wavelength return signals suitable for use as an alternate embodiment to the bi-static free-space optical embodiment of FIG. 3. Referring to FIG. 10, the pulsed, laser light of the alternate embodiment may be generated by a fiber optic laser 170, which may be of the type manufactured by Aculight, under the model no. PF1550-36, for example. An output of laser 170 may be coupled to a fiber optic cable 172 so that the light pulses generated thereby are transmitted within the fiber core of the fiber cable 172.

While in this alternate embodiment, a fiber optic laser is used to generate the laser pulses, it is understood that other pulsed laser sources may be used just as well. For example, the microlaser 30 described herein above in connection with the embodiment of FIG. 3 may be used in this alternate embodiment so long as the emitted laser light is transmitted within the core of the fiber cable 172. The characteristics of the generated laser light may be similar to or substantially the same as described for the microlaser 30 supra.

A fiber optic circulator 174, which may be of the type manufactured by Oz Optics, under the model no. OC-3-1550, for example, may be fiber coupled to the fiber cable 172. In the present embodiment, the circulator 174 may have three optical ports 1, 2 and 3 and the fiber cable 172 may be fiber coupled to port 1. One end of another fiber optic cable 176 may be fiber coupled to port 2 of the circulator 174 and extend out a distance therefrom. A collimating lens 178 is disposed in proximity to the other end of the fiber cable 176. Another fiber optic cable 180 is fiber coupled between port 3 of the circulator 174 and a port 1 of another fiber optic circulator 182, which may be of the same or similar type to that of circulator 174.

Yet another fiber optic cable 184 is fiber coupled between a port 2 of the circulator 182 and an input of a fiber coupled, edge type optical filter 186 which may be tuned to the same or similar sharp cut-off, edge filter response curve (see FIG. 2) as that of the optical element 68 in the free-space embodiment of FIG. 3. In this alternate embodiment, the optical filter 186 may be of the Fabry Perot filter type manufactured by Micron Optics, under the model no. FFP-ITU, for example. An output of the edge optical filter 186 may be fiber coupled to an input of a fiber optic amplifier 188, which may be of the type manufactured by MPB Communications under model no. FOA0XS, for example, by another fiber optic cable 190. An output of the amplifier 188 may be fiber coupled to an input of a light detector 192, which may be of the type manufactured by Fermionics Corporation under the model no. FD80, for example, by another fiber optic cable 194. Disposed at the cable 194, to minimize amplified stimulated emissions, may be a fiber coupled, narrow bandwidth, fiber optic filter 196, which may be of the type manufactured by Oz Optics under model no. FF-11-1550-8, for example.

Port 3 of the circulator 182 may be fiber coupled to an input of a second fiber optic amplifier 198, which may be of the same or similar type as that of the amplifier 188, for example, by another fiber optic cable 200. An output of the amplifier 198 may be fiber coupled to an input of a second light detector 202, which may be of the same or similar type as that of the detector 192, for example, by another fiber optic cable 204. Disposed at the cable 204 may be a second fiber coupled, narrow bandwidth, fiber optic filter 206, which may be of the same or similar type as that of filter 196. It is understood that fiber amplifiers 188 and 198 as well as optic filters 196 and 206 may be omitted in some implementations.

Each of the fiber optic cables of the foregoing described embodiment may be of the single mode fiber, narrow bandwidth type, for example. And, the fiber coupling of the fiber cables to their respective fiber optic elements may be accomplished by well-known fiber coupling techniques, like fiber fusing, for example. Accordingly, the fiber optic embodiment may be made as small and condensed as desired by bending the interconnecting fiber cables into a compact package. A limiting factor to the compactness is any power losses resulting from conducted light through the bends of the fiber optic cables.

In operation, pulsed laser light emitted from the laser source 170 may be conducted through the core of fiber cable 172, through the circulator 174 from port 1 to port 2, and through the core of fiber cable 176 wherein it is emitted into free-space toward the lens 178 as illustrated by arrowed lines 210. The lens 178 collimates and directs the transmitted laser light from the instrument as shown by the arrowed lines 212. In the present embodiment, the pulsed, laser light 212 may be focused toward the ground directly, or directed to the ground through a rotatable mirror assembly similar to the assembly described herein above in connection with the exemplary embodiment of FIG. 4. Resulting pulsed light reflections or returns 214, from the ground or otherwise, may be received by the collimating lens 178 which focuses the received light to the core of the fiber cable 176, as denoted by the arrowed lines 210, for conduction therethrough. To ensure proper optical alignment in an aircraft environment, for example, the lens 178 may be mounted on a rigid and thermally stable assembly.

Light returns are conducted through fiber cable 176 in a direction opposite to the transmitted laser light, through the circulator 174 from port 2 to port 3, and through the fiber cable 180. The light returns will continue through the circulator 182 from port 1 to port 2, through the fiber cable 184, and to the input of the Fabry Perot filter 186. As noted above, the Fabry Perot filter 186 has a response characteristic curve shown by way of example in the graph of FIG. 2. Note that the response curve exhibits a very sharp cut off transmission response with respective to wavelength. In the present embodiment, the Fabry Perot filter may be tuned such that the unshifted laser line $\lambda_0$ is approximately halfway down the cut-off edge. In this manner, a Doppler shift in wavelength of $\Delta\lambda$ will fall at a different point along the edge of the filter response curve and experiences a difference, $\Delta T$, in filter transmission of the reflected pulses.

Thus, as shown in the illustration of FIG. 10, a first portion of the return pulses, denoted by the arrowed line 220, will be transmitted or passed through the filter element 186 and conducted through the fiber cable 190 based on the wavelength Doppler shift $\Delta\lambda$ thereof. A second or remaining portion of the return pulses, denoted by the arrowed line 222, will be reflected by the filter element 186 and conducted back through the fiber cable 184. There may be some loss of optical signal in the filter element 186, but this should affect both the transmitted and reflected portions in a measurable and repeatable manner and thus can be accounted for in the data processing.

The reflected return pulses 222 are conducted through the circulator 182 from port 2 to port 3, through the fiber cable 200 and to the fiber optic amplifier 198. Likewise, the transmitted return pulses 220 are conducted through the fiber cable 190 to the fiber optic amplifier 188. The amplifiers 188 and 198 may be included in the present embodiment to enhance or increase the optical signal level of their respective transmitted and reflected return signals, perhaps by an amplification factor of approximately $10^4$, for example. It is understood that if the return signals are of sufficient signal level, the amplifiers 188 and 198 and their associated narrow band filters 196 and 206 may not be used.

The amplified optical signals output from the amplifiers 188 and 198 are passed through respective fiber optic, narrow bandwidth filters 196 and 206 in their fiber optic paths to the light detectors 192 and 202, respectively. The filters 196 and 206 are used in the present embodiment to minimize any amplified stimulated emissions from the amplifiers 188 and 198. Thus, if such stimulated emissions are considered within acceptable levels, then the filters 196 and 206 may be omitted from the present embodiment. The light detectors 192 and 202 operate to convert the first and second portions of the return pulses into corresponding electrical signals S1 and S2, respectively, which may be processed according to the embodiments described herein above in connection with FIGS. 5 and 6, for example, to compute the ground velocity and altitude measurements 116 and 120, respectively.

In an alternate embodiment, an optical delay line, which may be a long fiber cable, for example, may be disposed between the fiber optic paths 200 and 190, such as denoted illustratively by the dashed line 224, and fiber coupled to the detector 192 via optic amplifier 188 and optic filter 196. Accordingly, a common detector 192 may be used to detect both the transmitted and reflected return pulses 220 and 222, respectively, because the reflected return pulses 222 will be delayed by a known time from the transmitted pulses 220. Thus, the second detector 202 and associated optic amplifier 198 and optic filter 206 may be omitted from the embodiment. Preferably, this time delay embodiment would be used when the return signals are from a known range, e.g. if the transmitted light is focused at a specific range. It is understood that if the return signals are of sufficient signal level, the amplifier 188 and associated narrow band filter 196 may be also omitted from this alternate embodiment.

The foregoing described fiber optic embodiment of FIG. 10 offers a number of advantages including: ease of optical alignment, and the potential to be compactly packaged and light weight, which is ideal for an aircraft environment. The embodiment is also capable of measurement of range resolved air velocities, in addition to ground velocities. For example, the transmitted laser pulses may be directed to propagate through the atmosphere from the aircraft. As the transmitted laser pulses propagate through the atmosphere, the lens 178 may collect backscattered light returns of sufficient signal strength at each of a number of points along the flight path of an aircraft. To obtain true air speed, the output pulsed laser light may be scanned about an optical axis towards the front of the aircraft using the scanning embodiment of FIG. 4, for example, which would allow the mapping of the true air velocity field in front of the aircraft.

While the present invention has been described above in connection with one or more embodiments, it is understood that these embodiments were presented by way of example. Accordingly, the present invention should not be limited in any way by the exemplary embodiments, but rather construed in breadth and broad scope in accordance with the recitation of the appended claims.

What is claimed is:

1. A fiber optic filter edge detector of Doppler shifted light comprising:
    a laser source for emitting pulsed laser light substantially over a first fiber optic path;
    an optical lens for directing laser light emitted from said first fiber optic path to free-space and for receiving laser light returns from free-space and focusing said laser light returns to said first fiber optic path;
    an edge filter optical element fiber coupled to said first fiber optic path for receiving said laser light returns, said edge filter optical element operative to transmit a first portion of said laser light returns through a second fiber optic path and to reflect a second portion of said laser light returns through a third fiber optic path; and
    at least one light detector optically coupled to said second and third fiber optic paths.

2. The detector of claim 1 including a first fiber optic element disposed in said first fiber optic path for directing said laser light through said first fiber optic path to said optical lens and for directing said laser light returns from said first fiber optic path to a fourth fiber optic path; and a second fiber optic element disposed in said fourth fiber optic path for directing said laser light returns through said fourth fiber optic path to said edge filter optical element, said second fiber optic element operative to direct said second portion of laser light returns through said third fiber optic path.

3. The detector of claim 2 wherein the first and second fiber optic elements each comprises a fiber optic circulator.

4. The detector of claim 1 wherein the optical lens comprises a collimating lens.

5. The detector of claim 1 wherein the laser source comprises a fiber optic laser.

6. The detector of claim 1 wherein the edge filter optical element comprises a Fabry Perot optical filter.

7. The detector of claim 1 including an optical amplifier disposed in each of the second and third fiber optic paths.

8. The detector of claim 1 including a narrow bandwidth optical filter disposed in each of the second and third fiber optic paths.

9. The detector of claim 1 including a light detector fiber coupled to each of the second and third fiber optic paths.

10. The detector of claim 1 including an optical delay line disposed in one of the second and third fiber optic paths.

11. The detector of claim 1 wherein the at least one light detector converts the first and second portions of laser light returns into respective first and second electrical signals representative thereof; and including a processing unit for processing the first and second electrical signals.

12. A fiber optic, laser-based apparatus for determining both altitude and ground velocity of an aircraft, said apparatus comprising:
    a laser source for emitting pulsed laser light substantially over a first fiber optic path;
    an optical lens for directing laser light emitted from said first fiber optic path to a free-space optical path;
    an optical scanner disposed in said free-space optical path for directing said laser light from said optical lens to desired ground positions, and for receiving laser light returns from said ground positions and directing said laser light returns back to said optical lens that is operative to focus said laser light returns to said first fiber optic path;
    an edge filter optical element fiber coupled to said first fiber optic path for receiving said laser light returns, said edge filter optical element operative to transmit a first portion of said laser light returns through a second fiber optic path and to reflect a second portion of said laser light returns through a third fiber optic path; and
    processing means for determining altitude and ground velocity of said aircraft based on said first and second portions of laser light returns.

13. The apparatus of claim 12 wherein the processing means includes at least one light detector optically coupled to the second and third fiber optic paths for converting the first and second portions of laser light returns into respective first and second electrical signals representative thereof; and circuit means coupled to said at least one light detector for processing said first and second electrical signals to determine altitude and ground velocity of the aircraft.

14. The apparatus of claim 12 wherein the processing means includes means for determining a laser light ground scan vector of the scanner for each ground position; and wherein the processor is operative to associate the ground speed with the corresponding ground scan vector for each ground position.

15. The apparatus of claim 14 wherein the processor is operative to determine ground velocity using the ground speeds and corresponding ground scan vectors of at least three ground positions.

16. The apparatus of claim 12 wherein the first and second portions effected by the edge filter optical element are dependent on the Doppler wavelength shift of the ground reflected laser light returns.

17. The apparatus of claim 16 wherein the edge filter optical element comprises a Fabry Perot optical filter.

18. A fiber optic, laser-based apparatus for generating signals for use in determining both altitude and ground velocity of an aircraft, said apparatus comprising:

a laser source for emitting pulsed laser light substantially over a first fiber optic path;

an optical lens for directing laser light emitted from said first fiber optic path through a first free-space optical path to ground, and for receiving laser light returns reflected from ground through a second free-space optical path and focusing said laser light returns to said first fiber optic path;

an edge filter optical element fiber coupled to said first fiber optic path for receiving said laser light returns, said edge filter optical element operative to transmit a first portion of said laser light returns through a second fiber optic path and to reflect a second portion of said laser light returns through a third fiber optic path; and at least one light detector optically coupled to said second and third fiber optic paths for converting said first and second portions into first and second electrical signals representative of said first and second portions, respectively.

19. The apparatus of claim 18 wherein the first and second portions of laser light returns effected by the edge filter optical element are dependent on the Doppler wavelength shift of the ground reflected laser light returns.

20. The apparatus of claim 19 wherein the edge filter optical element comprises a Fabry Perot optical filter.

* * * * *